United States Patent
Kee et al.

[11] Patent Number: 5,731,799
[45] Date of Patent: Mar. 24, 1998

[54] PIXEL-WISE VIDEO REGISTRATION SYSTEM

[75] Inventors: Jennifer Sue Kee, Mesa; David Michael Jacobs, Chandler; Carl Henry Voegtly, Scottsdale, all of Ariz.

[73] Assignee: Motorola Inc., Schaumburg, Ill.

[21] Appl. No.: 784,430

[22] Filed: Jan. 16, 1997

Related U.S. Application Data

[63] Continuation of Ser. No. 261,861, Jun. 17, 1994, abandoned.

[51] Int. Cl.$^6$ .................................................. G09G 5/12
[52] U.S. Cl. .................................................. 345/113
[58] Field of Search ............... 345/113–116; 348/510, 348/516, 517, 555, 565, 584, 586, 589

[56] References Cited

U.S. PATENT DOCUMENTS

| | | | |
|---|---|---|---|
| 4,490,741 | 12/1984 | Hornback | 348/550 |
| 4,498,098 | 2/1985 | Stell | 348/510 |
| 4,639,765 | 1/1987 | D'Hont | 348/517 |
| 5,060,066 | 10/1991 | Roberts | 348/516 |
| 5,351,067 | 9/1994 | Lumelsky et al. | 345/113 |
| 5,432,560 | 7/1995 | Ersoz et al. | 348/565 |
| 5,450,097 | 9/1995 | Takebe | 345/113 |

OTHER PUBLICATIONS

"Dornier/GEOGRID, Geographical Information Display" (Reproduction of German military maps with permission of German Military Map Agency–Licence BH0001–1.

*Primary Examiner*—Jeffery Brier
*Attorney, Agent, or Firm*—Frank J. Bogacz

[57] ABSTRACT

A video display system has a high resolution video multiplexer for synchronizing video sources in pixel-wise registration for display on a monitor. Video sources are overlayed one on another in pixel-by-pixel registration. A master/slave relationship is established between the video sources so that the pixels of one source (master) are overlayed on the pixels of another video source. The display of the master video source is synchronized with the slave source(s). Then the master video source is delayed while the system prioritizes among the video sources. The composite overlayed video is then displayed on a monitor.

18 Claims, 3 Drawing Sheets

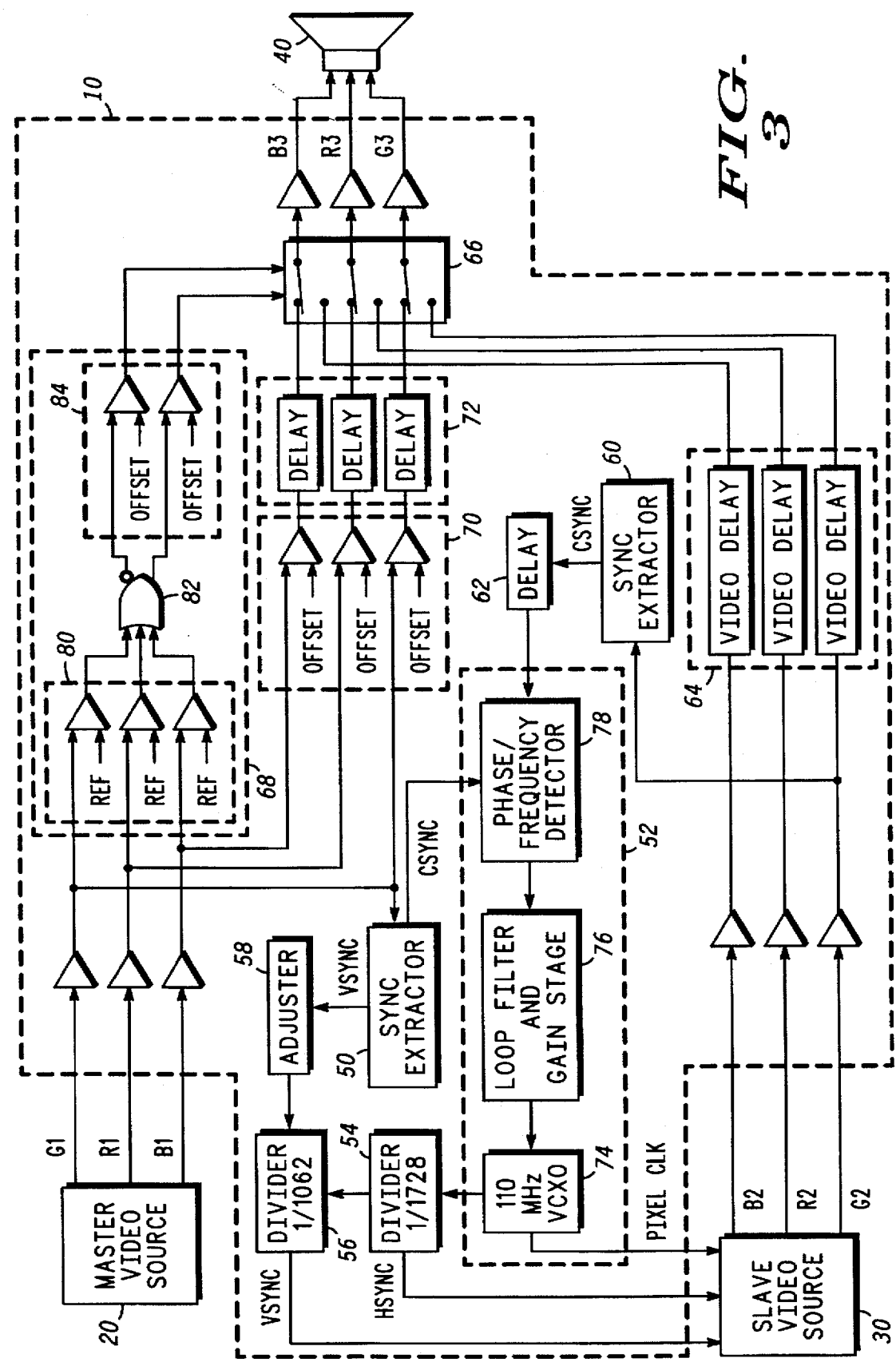

PIXEL-WISE VIDEO REGISTRATION SYSTEM

This application is a continuation of prior application Ser. No. 08/261,861, filed Jun. 17, 1994, now abandoned.

GOVERNMENT LICENSE RIGHTS

The U.S. Government has a paid-up license in this invention and the right in limited circumstances to require the patent owner to license others on reasonable terms as provided for by the terms of contract no. DAAB07-87-C-S015 awarded by the U.S. Army.

BACKGROUND OF THE INVENTION

The present invention pertains to video displays and more particularly to a system for synchronously overlaying video sources for display.

Video combiners in extensive use today combine video from two separate sources using a chroma-key multiplexing technology. The majority of video and film multiplexing applications, such as film and video special affects, rely on this chroma-key technology.

When the two video sources are multiplexed using this approach the two video sources are not necessarily in pixel alignment. For example, establishing a reference point on Video source "A" and the exact reference point on Video source "B" and combining these two sources using a chroma-key video multiplexer does not produce a resultant image with each video source placing the reference point at the exact same spot.

The misalignments are due to video delay and lack of synchronization between the video sources. This technique is sufficient for most video combining applications where spatial accuracy is not required. However, in applications where the resultant image generated by the multiplexing of two separate video sources must be pixel-wise registered an alternate approach is required. An application might include the overlay of vehicle ground truth data (obtained by a positioning system or radar) from Video Graphics source "A" and Electronic Map data from Video Graphics source It is important that the vehicle ground truth data and map features such as roads, rivers, etc. are in exact pixel alignment, i.e. the vehicles from graphics source "A" appear on the road networks from graphics source "B".

Accordingly, it is an advantage of the present invention to provide an apparatus that will permit the combining of two (or more) video sources with the resultant integrated image being in exact pixel registration.

BRIEF DESCRIPTION OF THE DRAWINGS

FIG. 3 is a schematic diagram of the High Resolution Video Multiplexer shown in FIG. 2 in accordance with the present invention.

DESCRIPTION OF THE PREFERRED EMBODIMENT

Figure 1:
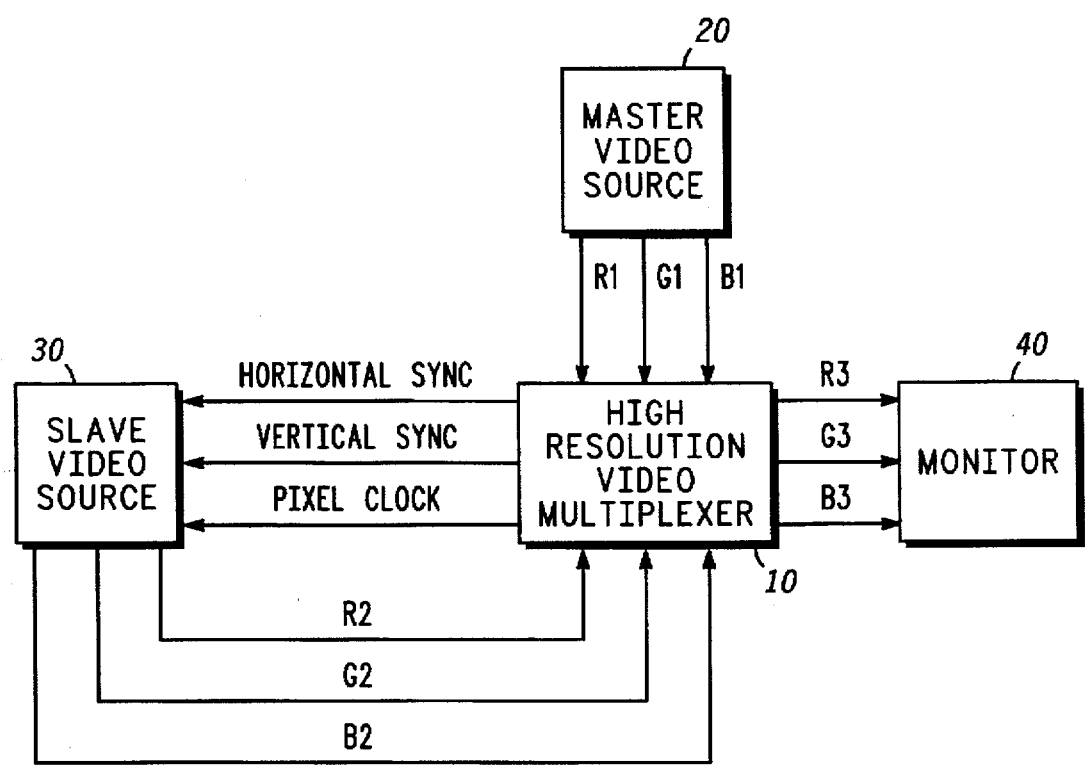
FIG. 1 is a top level functional block diagram in accordance with the present invention.

Referring to the diagram of FIG. 1, High Resolution Video Multiplexer is coupled to master video source 20, to slave video source 30 and to monitor 40.

Overlay, as used in this document, refers to the pixel by pixel combining and prioritizing of the pixel information from two or more video sources.

The purpose of the High Resolution Video Multiplexer (HRVM) 10 is to synchronize and prioritize two (or more) video sources so they can be integrated in registration and displayed on a common display monitor 40. The master video source 20 provides three video signals to the HRVM. The video signals are referred to as Red, Green, and Blue on the respective R1, G1 and B1 leads. These video signals adhere to the specifications of RS-343A standards. Each of these signals has an amplitude of 1.0 volt peak to peak. The upper 0.660 volts of each signal is reserved for the video information. The lower 0.286 volts of the signal is reserved for the synchronization information.

Synchronization information is contained on the green signal. The synchronization information includes the horizontal and vertical syncs. The horizontal sync defines the horizontal repetition rate and initiates the horizontal retrace. The vertical sync defines the vertical repetition rate (frame rate) and initiates the vertical retrace.

The slave video source 30 also provides three video signals to the HRVM 10. Likewise, these are R2, G2, B2 video signals which also comply to RS-343A standards and subsequently have the same amplitude and timing characteristics as the master video source. The synchronizing signals and clock data are derived from the master video source 20 and used as inputs to the slave video source 30. Hence, the slave video source 30 is totally synchronized to the master video source 20. One source will be prioritized over the other and will be displayed any time a pixel is active on any of the three video signals (R1, R2 and R3). In this case, the master video source has priority at all times. The HRVM 10 is coupled to the monitor 40 via the Red, Green and Blue signals on the R3, G3 and B3 leads, respectively.

Figure 2:
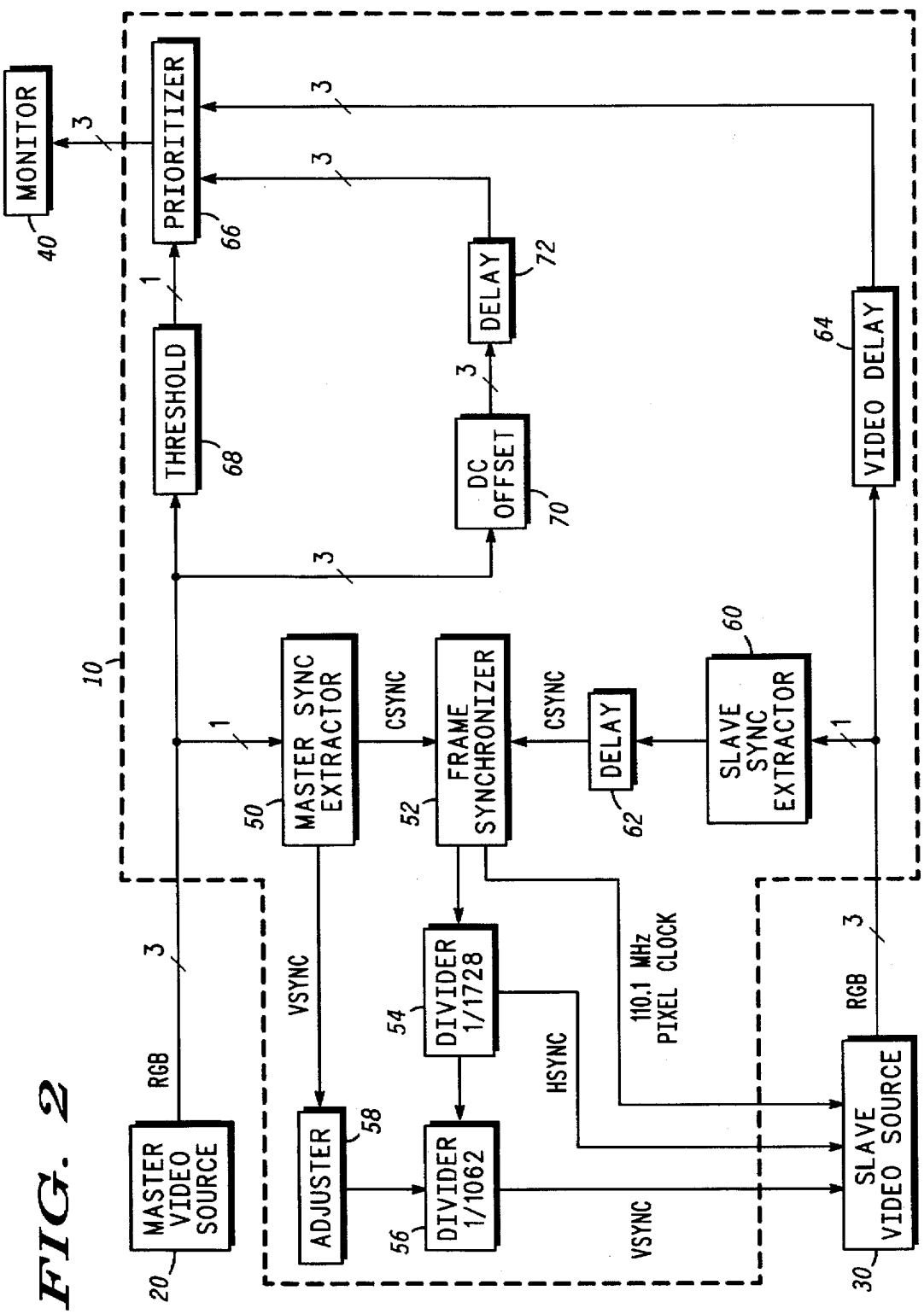
FIG. 2 is a block diagram of the High Resolution Video Multiplexer shown in FIG. 1 in accordance with the present invention.

Referring now to FIG. 2 a detailed view of the HRVM 10 is illustrated showing a functional block diagram. Again, the master video source 20 provides Red R1, Green G1 and Blue B1 video signals in compliance to RS-343A.

The Green video signal G1 from the master video source 20 is input to the master sync extractor 50 which extracts the vertical and horizontal syncs both as a discrete vertical sync only and composite vertical and horizontal sync signals. The vertical sync signal is input to the vertical sync adjuster 58. The vertical sync adjuster 58 compensates for delays up to a frame length created by the horizontal 54 and vertical 56 dividers and vertical sync pulse width inaccuracies induced by the master sync extractor 50.

The horizontal sync divider 54 takes the pixel clock signal from frame synchronizer 52 and divides it by 1728. The horizontal sync signal is further processed by the vertical sync divider 56 which divides by 1062. The vertical sync adjuster 58 insures vertical sync alignment of the master 20 and slave 30 video sources. The vertical sync divider 56 receives the output from the vertical sync adjuster 58 and uses it to create and align the vertical sync derived from the frame synchronizer 52 pixel clock. The vertical sync from the frame synchronizer is generated when the vertical sync divider 56 divides the approximately 63,719.9 Hz signal output from the horizontal sync divider 54 and divides it by 1062 to generate a vertical sync pulse running at approximately 59.99 Hz.

The frame synchronizer 52 creates a synchronous pixel clock by comparing the composite syncs from both video sources 20 and 30. The phase-locked loop advances or retards the phase (frequency) of the clock until the incoming horizontal sync pulses are aligned. The phase-locked loop clock becomes the pixel clock. From the pixel clock, both the horizontal and vertical syncs are created and are then used to bring the slaved video source 30 into time synchronization with the master video source 20.

The vertical sync pulse is input to the slave video source 30. The horizontal sync input to the slave source 30 is derived from the horizontal sync divider 54. The horizontal sync signal (63,719.9 Hz) is generated when the output from the frame synchronizer 52 is divided by 1728. The input of the frame synchronizer 52 originates from the slave sync extractor 60. The slave video source 30 provides Red, Green and Blue video signals in compliance to RS-343A. The Green video signal from the slave video source 30 is input to a sync extractor 60 which extracts the vertical and horizontal syncs both as a discrete vertical sync only and a composite vertical and horizontal sync signal. The slave composite sync signal is input to a slave sync delay device 62 which compensates for the composite sync delay time between the master 20 and slave 30 video sources. Therefore, a feedback path has been established between the master 20 and slave 30 video sources such that their corresponding vertical and horizontal syncs remain in constant alignment. Specifically, the frequency and phase of the pixel clock for the slave 30 video source is tightly controlled by the master video source 20. Any changes in the master video source 20 composite sync and pixel clock are immediately used to change the same parameters in the slave video source 30 composite sync and the pixel clock and any changes in the slave video source 30 composite sync are immediately corrected by the frame synchronizer 52. It is the above circuitry which is used to enable the HRVM 10 to permit the integrated display of the master 20 and slave 30 video sources without any viewer apparent pixel jitter or other video misalignments.

The processing for achieving video synchronization between the master 20 and slave 30 video sources has been established. Now the process for video delay compensation, pixel prioritization and pixel multiplexing will be described. All three video signals (R2, G2, B2) from the slave video source 30 are delayed by the slave video delay circuitry 64. This delay circuitry is crucial in that it must compensate for the time lag required for the master video signals to generate and control the prioritizer 66.

The delayed slave video signals are input from video delay 64 to the prioritizer 66. Video signals (R1, G1, B1) originating from the master source is input to the threshold 68. Threshold 68 controls the pixel prioritization function. The video from the master video source is compared, pixel by pixel (pixel-wise), to a specific reference level (close to the blanking level) which determines the existence of video information on the (R1, G1, B1) signals. If video is detected on any one of the three signals of master video source 20, the prioritizer output controls the state of an extremely high speed solid state switch which chooses all three of the master 20 video source's R1, G1, B1 signals for output on R3, G3 and B3 for display on the monitor 40.

Subsequently, if no master video source signal is detected the video from the slave source is output to the display monitor 40. Since RS-343A defines specific voltage amplitudes, but not actual DC voltage levels, one or both sources may need to be level shifted to provide optimum operation. If the video signals are not at the same level, it can cause video pedestals in the composite signal. Therefore, a DC offset 70 is provided to insure that the master 20 and slave 30 video sources have the same DC offset. Due to the extra time delay in threshold 68, compensating delays are added by delay 72 in the master video source signal paths and delay 64 in the slave video signals.

Referring now to FIG. 3, the components of the frame synchronizer 52 and the threshold 68 are illustrated in detail. The frame synchronizer 52 comprises three subsystems, the phase/frequency detector 78, the loop filter and Gain Stage 76 and the 110 MHz VCXO 74, all of which are serially coupled.

The inputs of the frame synchronizer 52 originates from the sync extractors 50 and 60. The slave video source 30 provides Red, Green and Blue video signals (R2, G2, and B2) in compliance to RS-343A standards. The Green video signal from the slave is input to a sync extractor 60 which extracts the vertical and horizontal syncs both as a discrete vertical sync only and a composite vertical and horizontal sync signal. The slave composite sync signal is input to the slave's sync delay 62 which compensates for the composite sync delay time between the master 20 and slave 30 video sources.

Prioritizer 66 includes three high speed switches for selecting between the video signals R1, G1, and B1 of the master video source 20 and the video signals R2, G2, and B2 of the slave video source 30.

The phase/frequency detector 78 compares the offset in time and frequency of the master composite sync generated by the master's sync extractor 50 and the composite sync input from the slave's delay 62. An error voltage is generated which is directly related to the offset detected between the master and slave composite syncs. The error voltage is filtered and the gain is established using the loop filter and gain stage 76. The DC offset voltage from loop filter and gain stage 76 is used to advance or retard the phase (frequency) of the 110 MHz VCXO 74. The VCXO functions as a pixel clock and reference for the horizontal, vertical sync generator for the slave video source 30. Therefore, a feedback path has been established between the master 20 and slave 30 video sources such that their corresponding vertical sync and horizontal sync and pixel clock signals remain in constant alignment.

Specifically, the phase (frequency) of the pixel clock for the slave video source 30 is tightly controlled by the master video source 20. Any changes in the master video source 20 composite sync is immediately used to change the same parameters in the slave video source 30 composite sync and any changes in the slave video source 30 composite sync are immediately corrected by the frame synchronizer 52. It is this circuitry which is used to enable the HRVM 10 to permit the integrated display of the master 20 and slave 30 video sources without any viewer apparent pixel jitter or other video misalignments.

Threshold 68 determines which individual pixel will be illuminated by either the master 20 or slave 30 video source on the system display monitor 40. Each video signal (R1, G1, B1) from the master video source 20 is applied to a dedicated comparator circuit 80 which compares the amplitude of the R1, G1, B1 signals of the master video source 20 to a reference signal (ref.). Typically, this reference signal is established just above the blanking voltage level. This reference signal can be adjusted, if desired to permit operations in a noisy environment. The closer to blanking the reference is set the more likely that noise will corrupt the prioritization process. The summer 82 sums the output voltages from the comparators 80. If there is video present on any one of the three video lines, the summer 82 generates a differential output signal to activate the switch driver 84. The switch driver 84 signal is level shifted to drive the prioritizer 66. The amount of level shifting is directly dependent on the type of solid-state switches used in the prioritizer 66.

The HRVM 10 invention is totally compliant to the form factor and voltage requirements of the ANSI/IEEE 1014-1987 VME bus specification. This invention can be implemented to require one VME circuit card assembly slot and the pin assignments for voltage input have been strictly adhered to.

A system has been shown which allows for the pixel-wise registration of two video source to within one pixel registration on a common video monitor. High resolution signals, such as 1280×1024 pixels, are combinable to form high resolution graphics display. Such a system may be useful for the display of vehicles on a roadway, for example. Differences in intensity of the two asynchronous sources are adjusted to provide an overlayed composite monitor video display with one common intensity.

The present HRVM 10 in its preferred embodiment uses a pixel clock rate of 110.1 MHz. This rate can be changed by using a different VCXO 74. Since the HRVM 10 can switch on a pixel-by-pixel basis, on a non-interlaced system, each pixel is approximately nine nanoseconds long. Prioritizer 66 switches within a small portion of this pixel time to avoid any loss of information.

Modifications to the present invention can be readily envisioned to accomodate variations in video format, three or more video sources, complex pixel prioritization or combining schemes, and variations in synchronization control features.

This invention provides a methodology and apparatus for performing video synchronization and associated pixel by pixel overlay of video data.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A pixel-wise video registration system comprising:
   a first video source for providing a first image including a plurality of pixels;
   a second video source for providing a second image including a plurality of pixels, said first image and said second image being asynchronously produced;
   a video multiplexer for overlaying said first image onto said second image in synchronous registration, one pixel at a time, to provide an overlayed video image, said video multiplexer coupled to said first video source and to said second video source;
   said video multiplexer including a prioritizer for selecting pixel-wise, said first image in first priority from said first video source and in second priority said second image from said second video source when a pixel of said first image is not present, said prioritizer operating within substantially less than a pixel time to switch between said first image and said second image, said prioritizer coupled to said first and said second video sources; and
   a monitor for visually displaying said overlayed video image, said monitor coupled to said video multiplexer and to said prioritizer.

2. A pixel-wise video registration system as claimed in claim 1, wherein the coupling of said video multiplexer to said second video source includes a plurality of signals including:
   a horizontal sync signal;
   a vertical sync signal; and
   a pixel clock signal for synchronizing said second image to said first image pixel by pixel.

3. A pixel-wise video registration system as claimed in claim 2, wherein said video multiplexer includes a first sync extractor for extracting said vertical sync signal, said horizontal sync signal, and a first composite vertical and horizontal sync signal from a green video signal of said first video source, said first sync extractor coupled to said first video source.

4. A pixel-wise video registration system as claimed in claim 3, wherein said video multiplexer further includes an adjuster for adjusting said vertical sync signal to provide an adjusted vertical sync signal, said adjuster coupled to said first sync extractor.

5. A pixel-wise video registration system as claimed in claim 4, wherein said video multiplexer further includes a first divider for dividing said adjusted vertical sync signal by a first predefined value, said first divider coupled between said adjuster and said second video source, said divider for transmitting said divided vertical sync signal to said second video source.

6. A pixel-wise video registration system as claimed in claim 5, wherein said video multiplexer further includes a second sync extractor for extracting a second composite vertical and horizontal sync signal from a green video signal of said second video source.

7. A pixel-wise video registration system as claimed in claim 6, wherein said video multiplexer further includes a delay for producing a delayed version of said second composite vertical and horizontal sync signal of said second sync extractor, said delay coupled to said second sync extractor, said second sync extractor coupled to said second video source.

8. A pixel-wise video registration system as claimed in claim 7, wherein said video multiplexer further includes a frame synchronizer for synchronizing said composite vertical and horizontal sync signal of said first video source with said composite vertical and horizontal sync signal of said second video source to produce said pixel clock signal, said frame synchronizer coupled to said first sync extractor and to said delay.

9. A pixel-wise video registration system as claimed in claim 8, wherein said video multiplexer further includes a second divider for dividing an output of said frame synchronizer to produce said horizontal sync signal, said second divider coupled to said frame synchronizer, to said first divider and to said second video source.

10. A pixel-wise video registration system as claimed in claim 1, wherein said video multiplexer further includes a video delay circuit for delaying red, green, and blue signals of said second video source comprising said second image, said video delay coupled to said second video source.

11. A pixel-wise video registration system as claimed in claim 10, wherein said video multiplexer further includes a threshold for determining whether information is present on at least one of a red, green, and blue lead of said first video source comprising said first image, said threshold for comparing each of said red, green, and blue signals to a predetermined reference signal, said threshold coupled to said first video source.

12. A pixel-wise video registration system as claimed in claim 11, wherein said video multiplexer further includes a DC offset for insuring that said red, green, and blue signals of said first video source and second video source have approximately a same DC offset, said DC offset coupled to said first video source.

13. A pixel-wise video registration system as claimed in claim 12, wherein said video multiplexer further includes a delay for delaying said red, green, and blue signals of said first video source, said delay coupled to said DC offset.

14. A pixel-wise video registration system as claimed in claim 13, wherein said prioritizer for selecting pixel-wise, said red, green, and blue signals in first priority from said first video source and in second priority from said second video source when a pixel of said first video source is not present, said prioritizer coupled to said threshold, to said delay, and to said video delay circuit.

15. A pixel-wise video registration system as claimed in claim 14, wherein said prioritizer includes a plurality of high speed switches for selecting between said red, green, and blue signals of said first video source and said red, green, and blue signals of said second video source on a pixel by pixel basis with priority to said first video source, said high speed switches coupled to said first video source and to said second video source.

16. A pixel-wise video registration system as claimed in claim 8, wherein said frame synchronizer includes:
   a phase/frequency detector for generating a voltage proportional to a difference in said composite vertical and horizontal sync signal of said first sync extractor and said composite vertical and horizontal sync signal of said second sync extractor, said phase/frequency detector coupled to said delay and to said first sync extractor;
   a voltage controlled adjustable oscillator for generating said pixel clock signal, said voltage controlled adjustable oscillator coupled to said second video source; and
   a loop filter and gain stage for adjusting a frequency of said voltage controlled adjustable oscillator to be constant, said loop filter and gain stage coupled to said phase/frequency detector and to said voltage controlled adjustable oscillator.

17. A pixel-wise video registration system as claimed in claim 15, wherein said threshold includes:
   a plurality of comparators for comparing said red, green, and blue signals of said first video source to a predetermined level to produce a plurality of outputs, said plurality of comparators coupled to said first video source;
   a summer for adding said plurality of outputs of said plurality of comparators to produce a first video output indicating whether any of the red, green, or blue signals of said first video source is present, said summer coupled to said first plurality of comparators; and
   a plurality of switch drivers for operating said plurality of high speed switches in response to said first video output of said summer, said plurality of switch drivers coupled to said summer.

18. A pixel-wise video registration system comprising:
   a first video source for providing a first image including a plurality of pixels;
   a second video source for providing a second image including a plurality of pixels, said first image and said second image being asynchronously produced;
   a video multiplexer for overlaying said first image onto said second image in synchronous registration, one pixel at a time, to provide an overlayed video image, said video multiplexer coupled to said first video source and to said second video source;
   a monitor for visually displaying said overlayed video image, said monitor coupled to said video multiplexer;
   a frame synchronizer for synchronizing a composite vertical and horizontal sync signal of said first video source with a composite vertical and horizontal sync signal of said second video source to produce a pixel clock signal for synchronizing said first image with said second image, said frame synchronizer coupled to said first video source and to said second video source; and
   a prioritizer for selecting pixel-wise said first image in first priority from said first video source and said second image in second priority from said second video source when a pixel of said first video source is not present, said prioritizer operating within substantially less than a pixel time to switch between said first image and said second image, said prioritizer coupled to said monitor, to said first video source and to said second video source.

* * * * *